(12) United States Patent
Glasgow

(10) Patent No.: US 12,187,574 B2
(45) Date of Patent: Jan. 7, 2025

(54) MATERIALS DELIVERY SYSTEM AND METHOD

(71) Applicant: Robert Glasgow, Phoenix, AZ (US)

(72) Inventor: Robert Glasgow, Phoenix, AZ (US)

(*) Notice: Subject to any disclaimer, the term of this patent is extended or adjusted under 35 U.S.C. 154(b) by 37 days.

(21) Appl. No.: 18/311,967

(22) Filed: May 4, 2023

(65) Prior Publication Data

US 2024/0369084 A1 Nov. 7, 2024

(51) Int. Cl.
*B65H 75/44* (2006.01)
*F15D 1/04* (2006.01)

(52) U.S. Cl.
CPC ..... *B65H 75/4478* (2013.01); *B65H 2701/33* (2013.01); *F15D 1/04* (2013.01); *Y10T 137/6921* (2015.04)

(58) Field of Classification Search
CPC ...... B65D 1/36; B65H 75/025; B65H 75/146; B65H 75/4478; B65H 2701/33; B65H 2557/37; B65H 2557/371; F15D 1/04; Y10T 137/6899; Y10T 137/6918–6962
USPC ............ 137/355.12, 355.16–355.28, 565.01, 137/565.17, 599.01, 599.02, 625.28, 861; 242/602, 602.2, 602.3, 603; 251/142, 251/149–149.9
See application file for complete search history.

(56) References Cited

U.S. PATENT DOCUMENTS

| | | | | |
|---|---|---|---|---|
| 2,735,717 A * | 2/1956 | Harman | ..... | B64F 1/28 244/135 A |
| 3,662,777 A * | 5/1972 | Plunkett | ..... | B65H 75/403 137/355.17 |
| 3,709,252 A * | 1/1973 | Bishop | ..... | B66F 9/205 137/355.17 |
| 3,766,996 A * | 10/1973 | Moody | ..... | E21B 19/084 173/147 |
| 2010/0282993 A1 * | 11/2010 | Kerrigan | ..... | F16K 35/14 251/231 |
| 2014/0352808 A1 * | 12/2014 | Liu | ..... | B65H 75/4478 137/355.27 |

* cited by examiner

*Primary Examiner* — Kenneth Rinehart
*Assistant Examiner* — Jonathan J Waddy
(74) *Attorney, Agent, or Firm* — AVEK IP, LLC

(57) ABSTRACT

A system of where internal friction otherwise known to be back pressure or resistance is eliminated and iterations of power transfers allows for a greater use of the effort put into the use of the device embodied within the 2 powered system, as presented here as to teach others how we, as in the use of shared and sustained power, may be able to reduce the consumption of power and where certain artifacts are taken to power stages within a hose. To aid in lessening the power needed when a material is compressed into a hose forcing a pump implemented in the duty range to produce such pressure is unduly burdened. To achieve equilibrium within the material delivery system by inducing movement and in doing so making the jerking action of energy transfer across unequal pressures to be relieved. The coordination of these simple components to the delivery that may be generated from this specification are to be considered the use of any of the parts as they are each unique to a developed system to deliver pressured materials through a hose. Operators of said equipment generated through this method may indulge in ease of operation within a lowered power range. This is a SAFETY METHOD.

6 Claims, 5 Drawing Sheets

MATERIALS DELIVERY SYSTEM AND METHOD

BACKGROUND

Field of the Invention

The present invention relates generally to materials delivery systems, and more specifically to a system and method to reduce friction and improve the delivery of materials through a hose.

Description of Related Art

Material delivery systems are well known in the art and include devices such as a hose, that is configured to delivery material from a first location to a second location through a conduit. As the length of the conduit increases, so does friction on the material being delivered therethrough. In order to combat this friction, some systems utilize extremely high pressure from the starting location, which can result in unsafe conditions. Safety is not taken into consideration in these conventional systems when engineering more and more power behind a hose made longer and longer. This is the "Bigger Hammer" effect, the evermore power assertion to compensate for excessive hose length, girth, or internal friction elements found in specific materials passed through specific material hoses. Think of pushing a cement block across a rubber mat, then remove the mat and push that same block across a painted surface, like the bed of a pickup truck to notice the effects of friction removal. This friction is compounded into a problem when the engineering ignores original purposing of the components within the hose delivery system.

One of the problems commonly associated with conventional systems is its limited efficiency due to friction. This problem is compounded in systems requiring longer hoses. Every foot of hose has its related friction coefficient and the gravity is figured into the situation like our block was dragged down by the friction of the rubber acting on the cement block as you pushed it across the rubber. Though increased power may push the pumped material better, this increase in power also increases the risk to safety. Conventional systems do little to take this safety feature into account, and accordingly, this endangers the operator.

Accordingly, although great strides have been made in the area of friction reduction, through the use of different lubrication methods, these are limited and once you apply a great deal of pressure, these methods including the use of forever chemicals, like PTFE's or Teflon® linings are made to be non-effective. Accordingly, there is still a need for a materials delivery system that is more safe than these conventional solutions offer.

The present invention provides for improvements over the state of the art. Specifically, the power usage is to be made more efficient than conventional systems and the use of cheaper power effects the savings in dollars of operation. This reduction of power is a big deal. As an example, imagine making a 500 foot line having to have a 30 HP motor to deliver proper pressure output to the output tip or nozzle. The present invention allows for taking the bigger engine from the starting end of the hose out of the equation to make the system safer. The shortcomings of existing systems will not be referenced anymore since it is obvious that the principle of applying more power is flawed to the point where people are getting hurt. The invention disclosed herein intends to unplug all of the unwarranted and unnecessary power discussed above. The present invention is configured to finesse the materials out of the hose using directed power as if to point source the energy to where it needs to be along an overall length of the hose, and not at the back of a hose, but in front of all of the friction in the hose, no matter the hose type or how much PTFEs or lubricants are used, too much power just alleviates the efforts of lubricants. For instance, put oil under your block on the rubber. It moves easier, but when you push down on the block it grabs the rubber making you apply more and more power to push it across the rubberized surface. The lubrication systems fail to unwarranted and excessive power. If you look at it sensibly, the power is not only unwarranted, but DEADLY. The present invention specifically allows for reducing power, while keeping equal or high pressure output.

Existing systems have no way of drawing the material through the hose, they just push harder and harder until something gives. For instance, the operator may need to get the pressure up so far passed 'safe' that they may wish to not use the rig. I would not blame them, it is not safe for operation. Say maintenance just sent out a new motorized rig with 5,000 psi at the aft of the system in order achieve 3,000 psi at the output. That 2,000 psi is wasted, accordingly, the present invention provides for using wasted power at the pump end of the system. The present invention is configured to use tip pressure at all times as opposed to pushing to get there, but drawing material and assisting in transport by alleviating the friction issue within iterations. Some iterations being better at reduction of resistance than others. The present invention does not use this bigger hammer, but the siphon and push from the path of least resistance.

DESCRIPTION OF THE DRAWINGS

The novel features believed characteristic of the embodiments of the present application are set forth in the claims attached. However, the embodiments themselves, as well as a preferred mode of use, and further objectives and advantages thereof, will best be understood by reference to the following detailed description when read in conjunction with the accompanying drawings, wherein:

Figure 1:
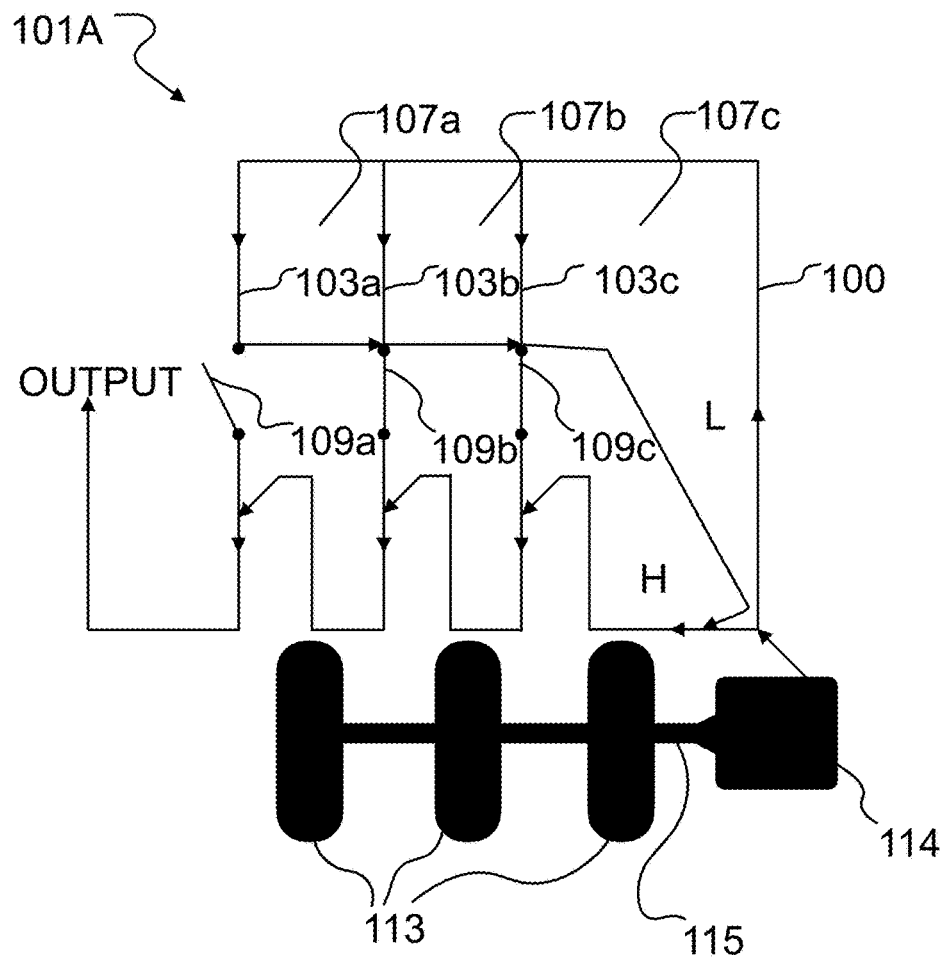
FIG. 1 is a simplified schematic of a material delivery improvement method in accordance with a preferred embodiment of the present application.
Figure 1:
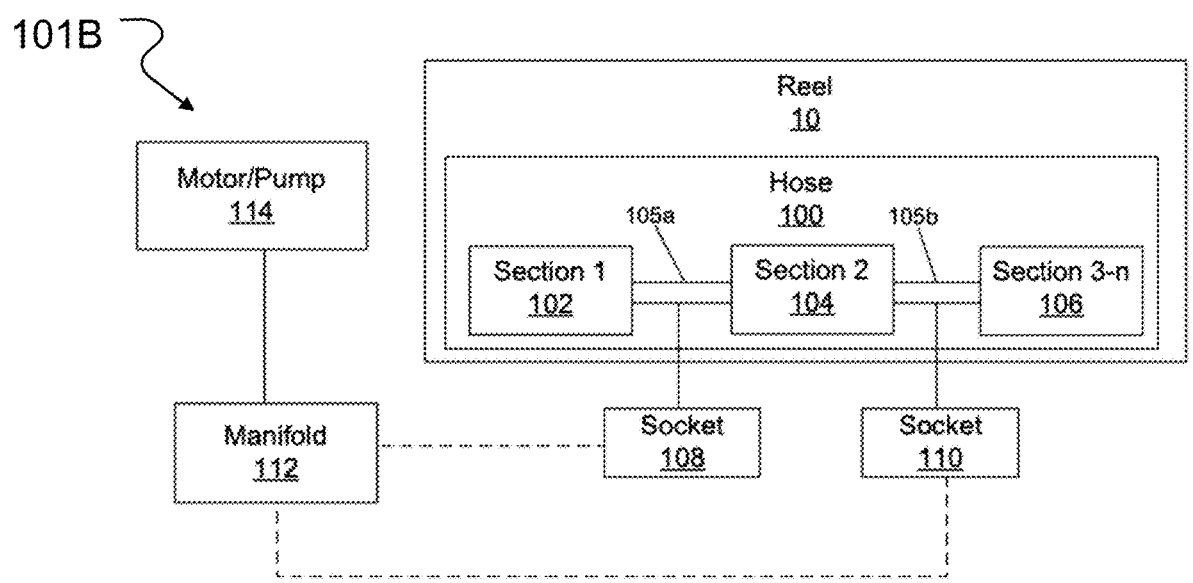

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional operator involvement with pressured material delivery systems. Specifically, the present invention provides for a system and method that allows for reduced power usage, while maintaining a desired output pressure. Abilities and unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several uses, FIG. 1 depicts a material delivery method 101A in a schematic free body diagram of a system in equilibrium, wherein materials are delivered throughout a hose 100 wrapped around a reel device (not shown in FIG. 1). The hose 100 will form a plurality of paths, wherein each path has an internal pressure, which is not necessarily that measured at the head of a pump 114. Pressure within the hose 100 is distributed across two paths, one feeding into the other where the injection of higher pressure, "H" in FIG. 1, is introduced to the materials within the other path. As pressure increases so does the need for more power. It may seem odd, but pressure makes it harder to do what pressure is supposed to do, push. Coefficients in the materials increase when pressure within the hose is increased. Since the manifold has no loading, it is considered the high pressure end of the pressure system. In other words, just because it takes more pressure to move the material through the hose, it doesn't mean that the material in the hose is the only material we can get ahold of to send through the system. We divert the pressure to make it a drive system, taking it through the series of injectors 103a-c. This is the power differential we motivate. We use it to nudge the mass in the hose along a shorter path and then the power differential decreases upon passing a point where the injectors and the route are made ineffective. Notice that the higher pressure is that at the bottom, if we view method 101A as a vertical standing unit where the sections labeled as iterations 107a-c are the top and the bottom connection to the hose 100 output is where the pressure is higher. this is depicted by the fork of power from pump 114. The concept is to use the extra energy in the pressure differential as power and to use the shorter route as a way to keep the system in equilibrium within a much lower power range exerted to the hose by the pump. Why beat up the hose until it is extended past a productive point. That is a beating on any hose 100 or otherwise used in current systems without ability to be used at any other capacity, the current systems. The path with least resistance shown as lines with arrows depicting direction are the network of power. Method 101A shows the equilibrium of the system and the flow. Figure that the hose 100 is going to yield a response to pump 114 pressure shown in method 101A through a manifold 112 bypassing the resistance inherent inside a hose limiting the movement of materials until the pressure to compensate the loading to the hose 100 from the pump 114 becomes equalized. The depiction of unravelling the hose from one of 3 iterations 107a-c as the continuity of the first iteration 107a of the hose 100 is section hose injector 103a. The hose 100 is now in 3 sections with each reflecting a longer path coinciding with activations by the corresponding quick release collars 109a-c as more hose 100 is unraveled to use.

Motor 113 is repeated in this figure to depict the use of a motor 113 per quick release collar 109a-c, one per iteration 107a-c and housed in the manifold 112 embodied into this diagram as a major component to the method of the present invention. Motors are depicted in FIG. 1 as being either one block of power or 3 blocks of power upon demand. The connecting shaft 115 puts the motors power in tandem rotating the pump according to demand put on the pump by the length of hose and its associated resistance. It is to be noted that the user of the delivery system will not have the hose 100 extended to a maximum length very often. So, we may expect to only use 1 or 2 motors most of the time an this mixed use may be distributed across the 3 motors 113 per hours of use for each motor and allow for not only less consumption of power, and making things safer, while having a lot less maintenance.

The key takeaway from FIG. 1 is that there is two sides to loading pump pressure. The push to the main heaviest is always going to be greater than any outlet to the load. So, taking the power output of the pump needed to move the materials through the hose 100 at a reduced pressure is okay. By placing the load past the resistance allows for a pulling of materials within the hose 100 section related to whichever iteration the length in play or being used at the time is running the material through the hose 100. The higher pressure side, that routed through a path of manifolds 112 will induce the materials closer to the pump 114 or the backend of the hose 100 by siphoning the materials from the hose where the pressure is lower through the injectors 103a-c coinciding within the same iteration 107a-c of hose 100 section. We are to refer to the front of the hose 100 as the output of materials as depicted in FIG. 1. Once the material has two ways to go, it will always take the path of least resistance. As shown in FIG. 1, process 101B, the system of the present invention includes a hose 100 which includes a plurality of sections 102, 104, 106. The hose 100 may be wound around a reel 10 in embodiments. As shown, each hose section is connected to the next section via connectors 105a, 105b. Each connector may further include a socket 108, 110 wherein each socket 108, 110 is selectively coupled to a manifold 112. The manifold 112 is further in fluid communication with a motor and/or pump 114 for receiving materials therefrom. This combination of components allows for the hose 100 to be used in sections, wherein pressure is applied only to the sections in use. For example, the manifold 112 is configured to first direct materials into the first section 102 through the socket 108 and connector 105a. As pressure is applied to the first socket 108, such as when the hose 100 is unwound to a certain point from the reel 10, the socket 108 will disengage from the manifold 112 such that materials will then be directed to the next socket 110 and connector 105b.

Figure 2:
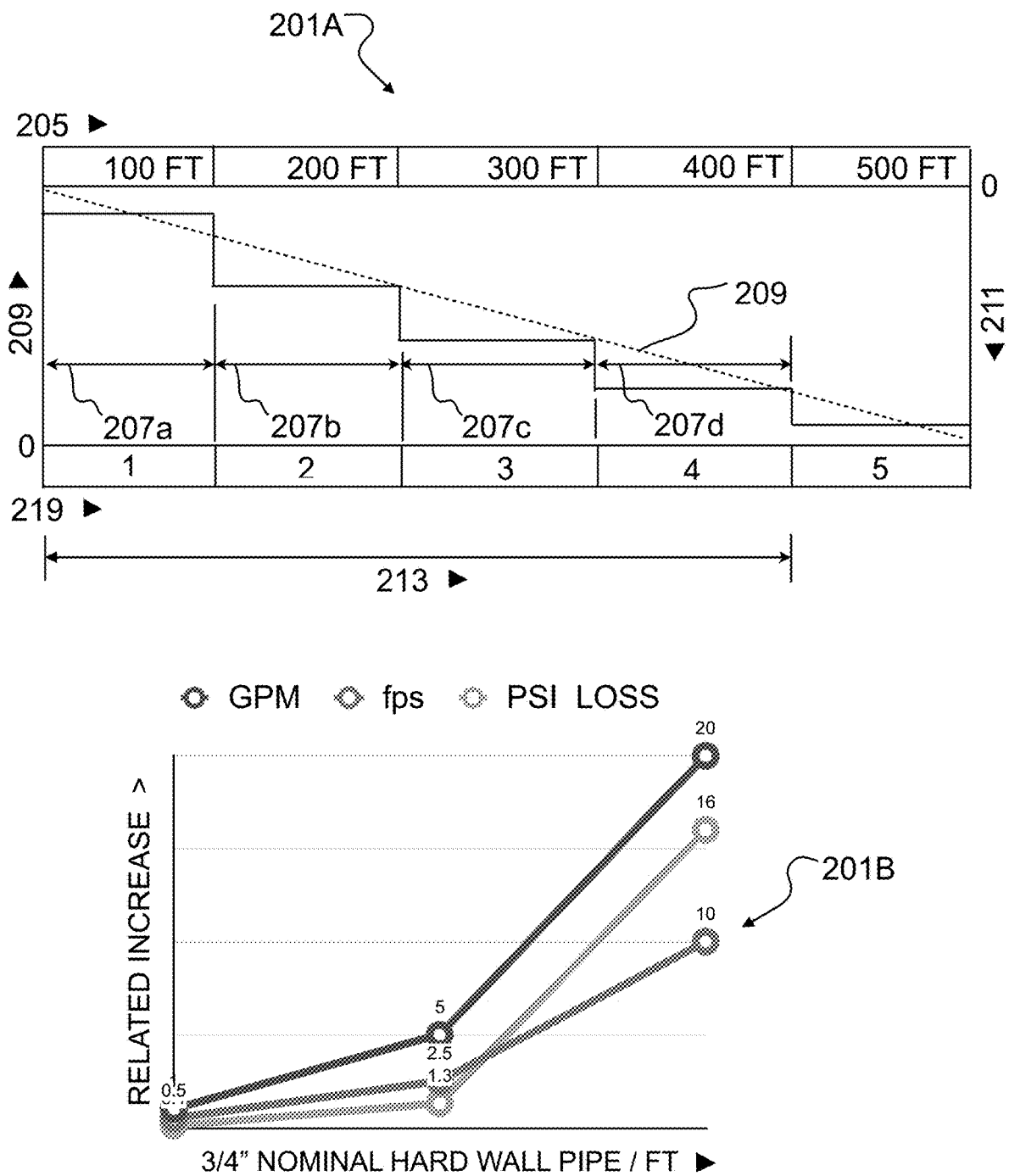
FIG. 2 is a chart showing typical energy reduction and savings associated with the method of FIG. 1 in accordance with a preferred embodiment of the present application.

Referring now to FIG. 2 the operation of the pressured manifold 112 is depicted in a chart 201A. The operation embodies creating a pressure environment, establishing parameters for pressured materials delivery throughout iterations of hose 100 section lengths. In chart 201A, each length of a hose is represented by the boxes (i.e. 100 FT) along the 205 line. Further, in chart 201A, a plurality of power range distinctions are depicted from 207a-d, allowing devices to join or express intention to join the power saving process 209 otherwise known as the average power usage, monitoring the iteration 107a-c coinciding with the power range 207a-d and proximity of the hose 100 length with respect to peak performance within a linear depiction of efficiency loss as the resistance 211 becomes a greater load burdening any pump and motor, no matter what the lubricant within the hose that is in place, because when pressure is applied the going gets tougher, activating the numerous motors 113 over an effective range 213 to power the pump 114 and power the method 101A. Power iterations 207a-d or power within any iteration 107a-c, except the hose section length and the rest of the hose as a reservoir of material with kinetic potential denoted as showing resistance 211. It is dynamic where the pressure changes between hose sections. We are reducing the static load within the hose, but there is still a differential in pressure, translated to power. It is an effect of 'all at once' that the motor and pump will feel. We lessen that response or need to respond so drastically by allowing the materials to be partially aided by the drafting process where we can keep the differential close to equilibrium. It isn't that the hose isn't moving material, it is that the hose is at a different pressure because the materials moving inside of it are not made to be pounded on from the back. The hose material really is at a different rate and yes, a different pressure. Once the injector and coupling are releasing the connection from that point the hose will transfer the load directly to the pump. That is why having more than one motor was the best fit. The manifold 112 allows for iterations of input 219 while activity is presented as gains, where the gain is by using less power to get more use options as well as a safer environment for all. Remember the gain is due to each iteration powering itself. Input 219 shows the sum of power losses due to resistance in the hose 100 and how when monitoring the use of the units as how many units or manifolds are in play at any one time, the use will gain the most power when the hose is not made to extend to its fullest, and I count on common sense to play a roll in recognition that power diminishes over length of hose adding to a friction we cannot remove by employment of the system. This system is meant to be used, not abused. Everybody that does the pressure systems gets that there is no replacement for power over most used lengths of line. We might even say that the system is more of a probability and the arc falls when the use exceeds the effective range 213, though it is recognized that the system as a whole works right up to the last set of manifolds and that the power given to withdraw the material is diminished as well because all the system can see is resistance; where when the system is used within a standard of normal benefits abound in safety first, followed by power usage drops, and then savings, in that order. This is more of a moral issue to the inventor and the use of this is to enable, not restrict by any means the use of such a method within this specification. The pressure shown in the flow through the pipe exemplified in FIG. 2, graph 201B is the radical component in the system. So, the theory is, the more radical it gets, the more we divert the energy to help push and pull along instead of just creating static resistance. The actual data I pulled from was for water per 100 ft of pipe. I backed out the 100 ft of pipe as to allow for a viscosity meeting the trends of power use or input into a system with an outlet. It may not be linear, but it is linear in thought to the 500 foot hose run in FIG. 2, 201A.

Figure 3:
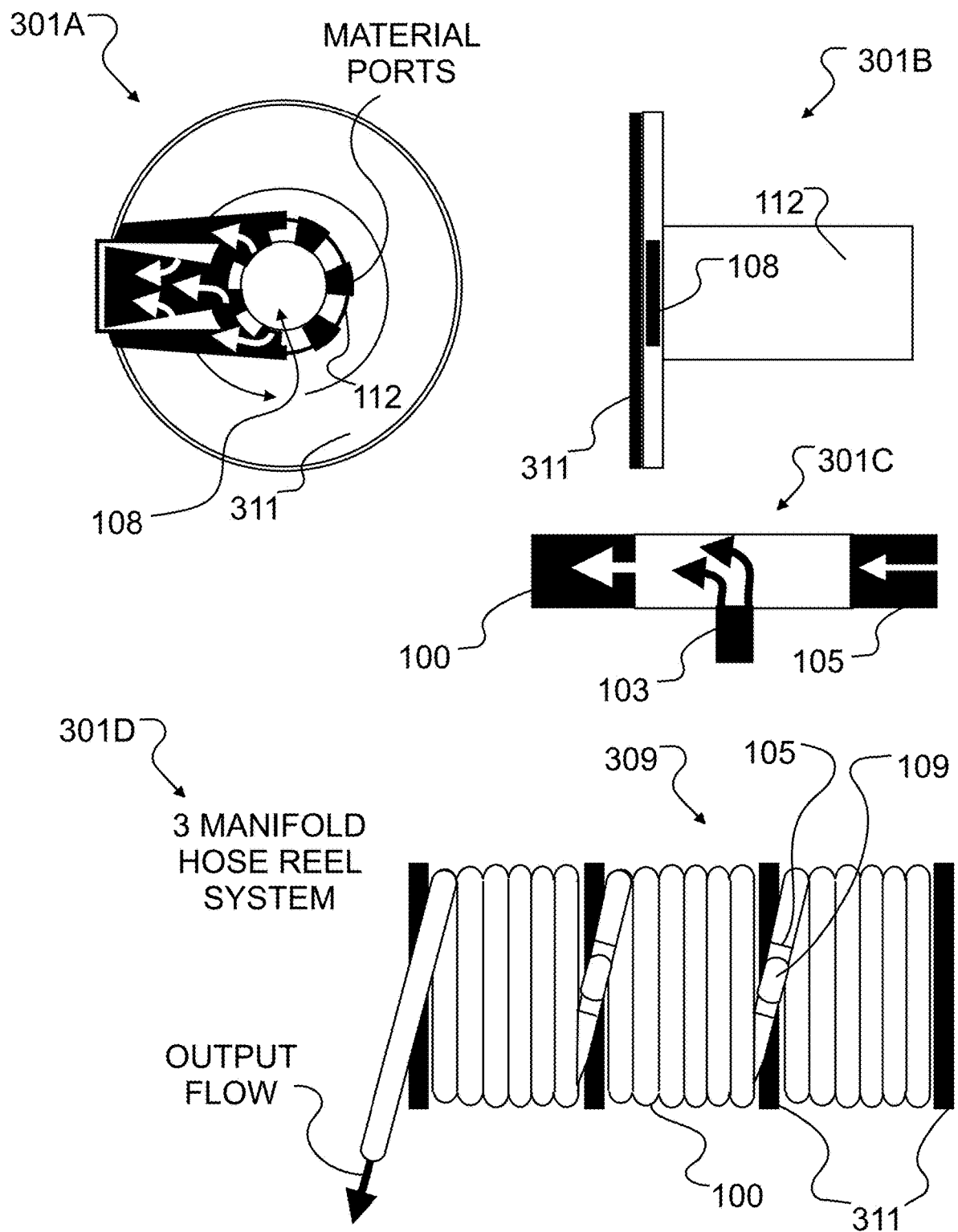
FIG. 3 is a simplified side view of a hose of the material delivery improvement method of FIG. 1 wrapped around a reel to demonstrate the assembly and use of manifolds, where 4 details show relative and working systems of the connector as well as the material transfer throughout the reel assemblage.

Referring now to FIG. 3 the interaction between the manifold 112 and components of an injector 103 is depicted. Delivery system, as represented by 301A, 301B, 301C, 301D illustrates the manifold 112 feeding materials into the socket 108 and through the connector 105 and its related injector 103-n while revealing the feed system within the manifold 112, under the cover plate 311. The manifold 112 transfers power among components of system 301A-D, particularly the socket 108, which in embodiments may be a connection collar, that is inserted into the manifold 112 to house the connector that injects the hose with higher pressure materials from one direction causing a siphoning effect in the hose to follow or that of the next iteration of 107a-d, socket 108, and connector 105 via assembly 309. Once the connector is clicked into the socket 108 and twist locked into position, the pressure will be allowed to flow through the connector into the hose from that point. The action of winding or loading the hose is to position the connector into the socket then pulling the hose over the manifolds guide plate and turning the socket until it clicks into the port defined by the operator or some other typical quick release application may be applied. This is more for the reader to get the feel of operation than to show any limitations to how this may work. The cover plate 311 is positioned over the left most manifold in the system as depicted in 301D. What you don't see is the circulatory action that the cover plate makes happen. See, the ports inside the manifold can be designated to go both ways, one at a time through each port. Think of cleaning it out, you need to flush past all surfaces. Now, what if the plate was a reversible thing where the with ports in FIG. 3's embodied socket 108 of 301A had the white ones going back and the black ones going out? Note that the socket fits over and around the manifold. It adjusts according to port alignment and is an outlet from the manifold. The cover plate may rotate to the next task alignment or routing task. The white magnitude arrows in 301C demonstrate the combining of pressures at different PSI can siphon the reservoir of hosed material. It is denoted that the material is circulating in the hose according to 301C. The connector port is similar to that at the manifold where the socket connects. Everything has to continue flow, the direction is just that. Volume is a major concern, so it is determined to give up real estate for the motor housing to make way for the materials to flow. Just think about a little hose outshining the big one in performance. And again, performance uses averaged use across average duty lengths of average hose. The connector 105 and its accompaniment of siphon injector 103 and hose 100.

It should be appreciated that in some embodiments, the system and method utilizes the girth of the hose and/or section of hose to create a flow through the manifold 112 of the present invention. The hose is wound around the manifold that becomes one division of the system bearing the load of the pressure and burden of gravity while unwinding and rewinding guided by a hose guide cover plate or cowling 311 over the socket 108 portion of the manifold 112. For example, there may be several sections that are varied in some degree and assembled to perform a certain delivery task. The hoses may vary from section to section and once the connection is confirmed, the socket 108 is adjusted to be tight before winding onto the next section by pulling the hose over the cowling and onto the next manifold. Embodied hose section shown in 301C shows two sections of hose in use and how power is supplied and the impact of the siphoning effect of injectors 103 attached to the hose are for input and that input can power a siphon effect within the trailing or lower pressured and presenting a myriad of impeding effects that we are eliminating from the system by simply following the path of least resistance, with a super charge implemented by each connector jet feeding into the siphoning effect and creating a sum of power savings over the length of a hose that may be distributed across several more manifolds and therefore iterations to the system feeding power lost at the backend to drive the materials from the front end of the system deployed and at which point it may be deployed across a distance of reasonable pressures to be expected due to friction coefficients associated with each type and varied girth of any delivery systems hose sections wrapped around assembly 309 and attached to their respective connection socket 108 to the manifold on which it is considered part of.

Figure 4:
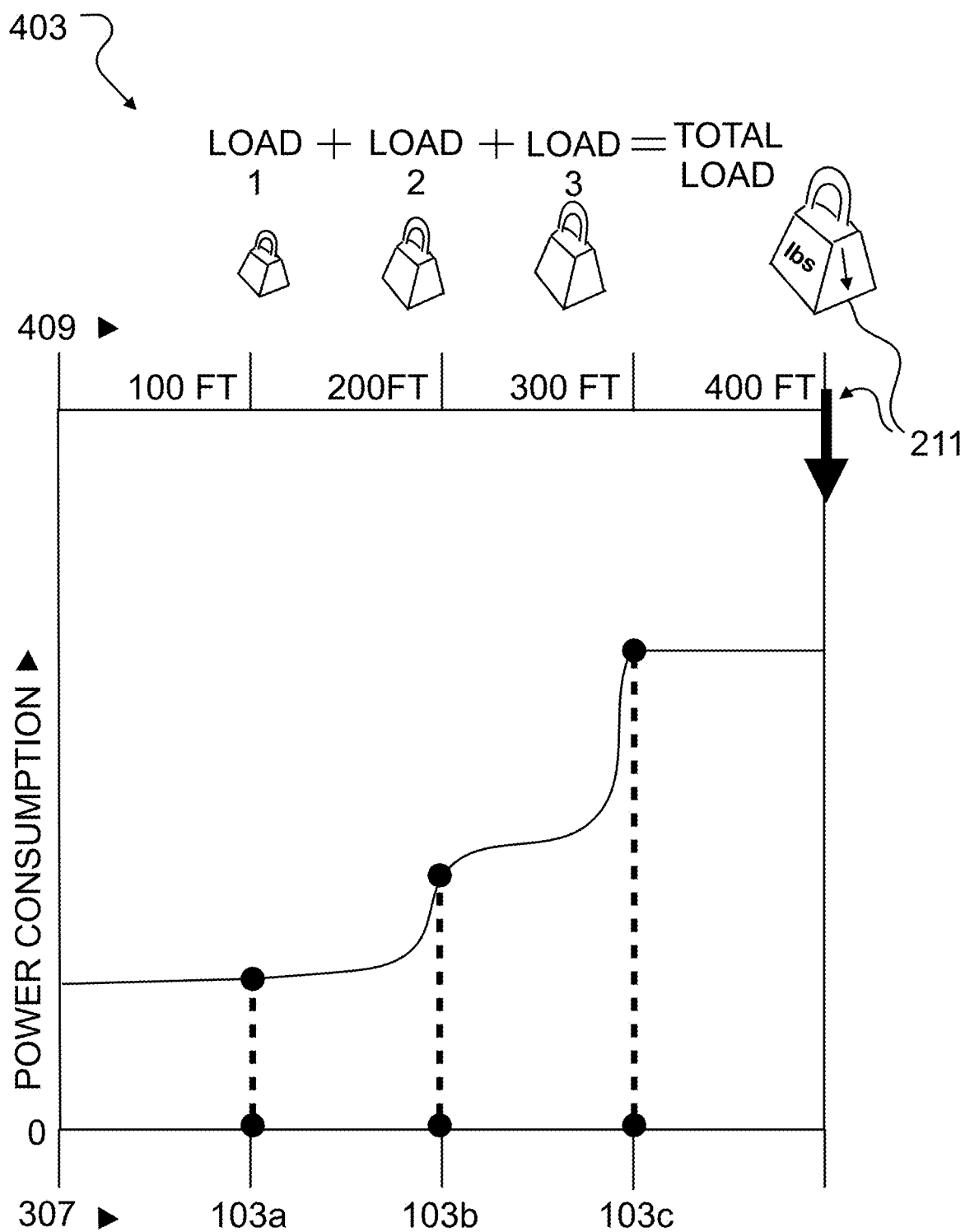
FIG. 4 is a chart showing a summation of the power consumed during operation of the material delivery improvement method.

An example of the use 403 of the system is depicted in FIG. 4. Using 403 to create summation of power saved by each iteration through each of its integral components as they contribute to the power saving process 209 and are details to how the power is saved by use of this methods components or any one of its components in tandem with similar devices already deployed to the field. Note that time is in iterations. The process is in iterations of timing. So, the iterations encompass all that is within that period of affect. The effected area or hose section is not of concern until using the periodic timing. The iteration shows expressly that one thing follows another. There is no jumping the shark. The average power saving process 209 is represented by the dotted line as it cascades down the iterations from FIG. 2 showing that the average power consumed is increased as we extend the hose 100. When one loading within the connector 105 occurs it is thought to be directed to the output or open output nozzle creating flow, not becoming back pressure added to common and predictable resistance using the manifold 112 in the hose section 409 of a pressure rig during a specific chore within the parameters of the equipment duty as according to type or category defined as to make everything a system of like parts fitting together where unlike system categories do not plug into one another, likened to the use of a garden hose to power a spray rig, something is going to blow, right? So we use a degree of caution in recognizing the likelihood of an operator wishing to change up duty of the rig, but having only so many options due to the structural allowances or duty level of the hose system. A fire hose is another example and this one everyone gets because you can't put a fire engine in places we can go by mounting a reel on the back of an all electric pickup truck and going to where the fire is, instead of waiting to fight fire when it comes, this is taking the fight to the fire and logistical support with materials like foams where there is more than one material being shot from the hose, but the pressures vary as well as the volume between the hoses but the compensation of delivery by one device is to have the manifold sort ports of delivery and mixing is either near the head or upon release from the hose 100 output nozzle. Harnessed hoses 100 and the such are common and contemplated to be a natural add on and the operator should have no trouble establishing proper performance in pressure to emission ratios needed as to be a proper mix upon delivery. Especially if one pressure parameter system is made of a certain connector type where more hose length won't be gained since the fittings are a category apart in duty rating standards that limit use of certain types of hose in the system. Everything being constant in manner and fitting type of a category allows for no substitution, however sizes of the hose in diameter and length in a section may contribute to how well the unit performed.

An example of present use would be a drag boat that has hoses hanging off the motor and tubes everywhere coming out of a hub and delivering to a particular portion of the intake manifold. These tuned injector hoses allow the boat to extend its power range by direct injection to the motor. This is a much less maintenance method of winning races instead of ramming hot air down into the cylinders, scorching valves and surfaces throughout the manifold creating a hazard. This injector fashioned power is rewarded by lower maintenance and a lower risk of injury due to blowing a blower off the top of a manifold during a race. And, blown dragsters must be completely broken down and rebuilt more often than the injector power style mainly due to heat effects because compressed air is so detrimental and the atomization is a forced effort similar to the bigger hammer mentioned above. Though this example is from a different heat source, the damages of heat are elevated by use of siphoning connectors 105.

Figure 5:
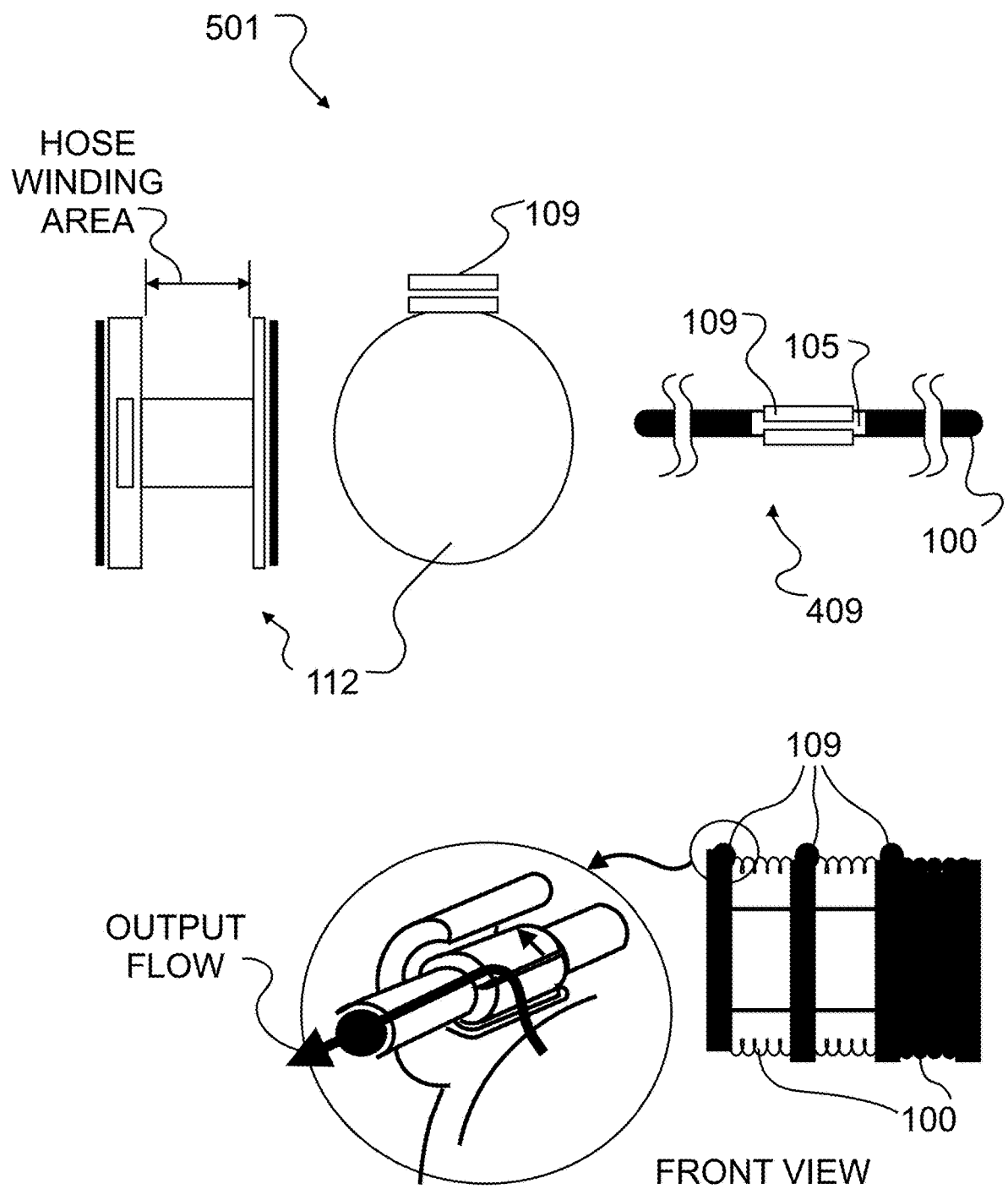
FIG. 5 shows individual components of the material delivery improvement method in accordance with a preferred embodiment of the present application.

The connector is being fed in FIG. 5 by the collared connector, or not? The option is in the cover plate above in the embodiment of the manifold 112. The "Front View" of FIG. 3 shows a void or varied hose for helping the cause of getting more hose out there. It is easier to move the rig displayed by its front view. Note, the quick release is noted by an arrow. This portion raises to let the connection come out of its collar, and hopefully we can power the reel of the disconnect.

But, what if it is just a prop? Where the standing in as to make more hose readily available is the given possibility as the connector is shown to be at the end of a hose length. When you add another hose to the connector and extend the use over the duty of the manifold, by reversing the cover plate or something like that, the connector becomes a midpoint for the math to the manifolds duty. The material is going to now flow through the third manifold shown not to be in service by the front view of assembly 501 and socket depiction.

LIST OF DEFINITIONS a. Manifold 112 distributes the material as it runs throughout all or sections of the entire hose 100 run, say in this case 500 feet. Remember, the hose may be routed as to jump across one or more manifolds 112 in order to enhance performance. There is all kinds of creativity this method can not take credit for, but we can spawn it. The materials always swirl and compress in a way that is not considered by Bernoulli's Law of physics. The pressure is put to the manifold(s) and the manifold has no resistance 211 compared to a length of hose 100 transporting material to act up against the power pushing from the pump 114. The pump 114 power is not reduced through the manifold 112, but it loses its ability to push on the hose 100 from the rear due to resistance 211. So, the manifold 112 unit is positioned to section the hose 100 into iterations 107*a-c* containing resistance 211 distributed along iterations 107*a-c* as related to length of hose 100, power ranges 207*a-d*. The first manifold 112 will have the most power. I know this is counter intuitive because you are still relating that power removed into the hose 100 wrapped around and around that you forgot we are delivering materials from the first section from the output, not the back closer to the pump 114. The material flowing through the manifold 112 is the same as that in the hose 100, but at a greater force due to less resistance. This is free power to the 500 feet of friction depicted in FIG. 2 along hose section lengths 205. This eliminates the path diagramed in FIG. 1 through the hose 100 and each manifold 112 allows for the same methodology applied in lining up these repetitive units, iterations 107*a-d*, we use head power to pull back power along the path as the higher forced material feeds the pressure end of the method 101A and 101B. The pressure is greater and the power needed is reduced.

b. The hose connector 105 is the part that is in between sections of the hose 100. The length of the hose 100 is that from hose connectors 105, FIG. 3, within the connector system represented in FIG. 1 by the injector embodiment 103*a-c*, plus whatever hose 100 is uncoiled from the reel and beyond a number of manifolds 112 or that so many connectors 105 are now just out there. The connector 105 houses the injector 103 and uses a quick release collar 109 from FIG. 5 to keep it connected to the socket 108. The back manifolds are still pulling the load and aiding on the power needed to push the material right up to the last manifold is made to be in play. The hose 100 fully extended is a statistical constant burden to the pump 114, but until getting to that point we can run the hose 100 with energy meeting sustainability standards because we are using the embodied connector 105, adding to the injector 103-*n* push and higher rate side of flow through the manifold 112 pull relieving the next section in the hose 100 closer to the pump, if not a little. The more the hose 100 is unreeled, the more friction is a problem. The trick is to use this method as a way to give internal power like a supercharger of sorts. It is the main unit that adds variability and pressure draws through the hose from pump 114 to output. The hose connector 105 shown in 301C is a connection point along the mass, that held within the hose, or load to be considered upon next disconnection 'reel', as well as the length of any hose section 409. 'Reel,' above, is the counteraction to the feed as a connector 105 disconnect burdens the pump with unequal loads and has to catch up. This reel is a major effect that can be eliminated by varied injector controls or even shut off if needed. Think of the connector as punching a hole in the side of a pressure line and putting a hose into the hole as to siphon a material additive to an energized system. Likened to the pressure washer having a hose to siphon degreaser into the flow of water at a high rate past the port. Like a straw only not sucking but blowing. This faster paced material passes over the open port (the hose 100) and drafts material toward the output.

c. The socket 108 is the part that positions the connector 105 into the manifold 112. This is a breakaway or quick release collar 109 represented in FIG. 5. The hose 100 section connector 105 is allowed to work upon clicking it into the socket 108 and locking it down with a twisting motion as the hose 100 is wound around the reel within the hose winding area depicted in FIG. 5. As the hose 100 is unwound from the reel, section embodied manifold 112 or iteration 107, from FIG. 4, to section manifold 112, these connectors 105 are released from their sockets 108 and the injector 103-*n* port is closed. As the socket 108 releases the hose connector 105 upon a slight tug on the hose 100 while being unwound, it is a component of a few working parts in relation to one another and the quick release collar 109, FIG. 5, door has to swing open to allow the connector 105 to come free from its respective socket 108. The operator could be 250 feet away and the hose 100 still has internal power working to ease the loading on the pump 114. This material deliver system and method has power up until the last stage. This socket 108 is meant to be the hose 100 variable item. Consider one socket 108 with three injectors 103 or a harness of feed hoses 100 and internal pressures as well as varied material feeds from the manifold 112 into its respective socket 108. The socket 108 is the connector 105 with a port injector 103 as well as the hose 100 feed from sections 409. It keeps the internal power within the entire assembly working through the connectors 105 and manifolds 112 delivering material to the injector 103 and releases the connector 105 upon need of more hose 100 to be put into play or unreeled for use.

d. The motor 113 is the drive in each hose section 409. Each (optional) motor 113 may have different loadings at different times and may have to be thought of as variable in drive speeds. Some motors 113 will work to keep the constant pressure that is being used and others will kick in as the operator feeds more friction into the system by running out more hose 100. Increased motor 113 speed is just a pump chore and remember, we are allowing this motor 113 to push on pressured materials from different manifolds 112, different pressures, and different volumes. A system may unite the ability to control the internals by adding to or constricting paths through orifices throughout the manifold's 112 material ports, as shown in FIG. 3. A variation of injector 103 tuning to extend the internal power range by volumetric and pressure modifications to injectors 103 embodied in this specification.

Those that participate in the use of this method are guarded against unwarranted power from being fed into the system and putting the operator at risk, this is a SAFETY method. This is a system dependent on parts working together toward a singular goal, optimum delivery. All parts should be manufactured as to never put the wrong component in a system of like components. A different duty or volume system should always have its own system peculiarities that, though annoying that an operator can't just submit their person to danger rating of a different fitting type, it is safer.

As a novel benefit, the hose 100 is held down under itself. The use of a hose 100 wrapped around a reel in sections 409 holds down the hose in each section, this keeps a hose 100 from going wild with pressure and unhinging the quick release collar 109 of the injector 103 to the manifold 112. It is not allowed to be untethered to the support or socket 108 until its section disconnects from the quick release collar. The logical winding of the hose so as to hold itself down is to be expected when using this machine with any duty of hose 100 or size of the manifold 112 used to transport materials across a distance. This may be novel in benefit and the mechanical restraint of winding a hose 100 as to be safe is just held to be self evident in use, "It will only work if you do it this way." The process of winding a hose is to be volumetrically ordered as to be the 'Best Fit' for the hose 100 within its winding area noted in FIG. 5. The manifold is not designed to be spun around and around in order to wind the hose 100, but to wind in such a fashion as to get the logical wrap of the hose 100 around the manifold, or powered reel section, explained above. The present invention encourages increased participation in operation and increases message penetration through the viral sharing of positive safety messages from operator to operator and manufacturer to manufacturer. Safety has a calming and communicative effect from the operator. It seems to be that the old systems using a bigger hammer are prone to danger and will become liabilities to operators than that of a productive machine. Think how you feel when being put in a situation where you have to be careful for all of the reasons except safety. The present invention uses sustainability as a tool taking unwieldy and unruly power and eliminates it. It should be appreciated that the method of the present invention makes owners of equipment secure in safety concerns and incentivizes community enhancements to any system enacted into a community.

It will be appreciated that the operation of the multiple sectioned hose system is great for grounding the unit when volatile solutions are put to task. The connecting sections of hose allows for regulated grounding per length.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed:

1. A materials delivery system, comprising:
   a hose having a first section, a second section, and a third section, the hose configured to wind around a reel;
   a first connector connecting the first section to the second section, the first connector is configured to open and close material flow between the first section and the second section;
   a first socket extending from the first connector and configured to engage with a first manifold;
   a second connector connecting the third section to the second section, the second connector having a second socket configured to releasably engage with a second manifold;
   a motor configured to operate a pump to create a flow of materials through the hose;
   wherein the first socket releases from the first manifold upon pressure being applied to the first socket;
   wherein flow is directed from the first manifold, through the first socket, and into the first section until the first socket releases from the manifold;
   wherein flow is directed from the second section to the first section when the first socket is released from the first manifold;
   wherein friction from the second section does not impact the first section when the second section is not in use
   wherein the second connector allows flow from the second manifold to the second section and then to the first section until pressure is applied to the second socket;
   wherein pressure applied to the second socket releases the second socket from the second manifold; and
   wherein flow is directed from the third section to the second section and then to the first section when pressure releases the second socket from the second manifold.

2. The system of claim 1, wherein each of the first and second connectors is a quick release connector.

3. The system of claim 1, further comprising:
   the reel having one or more guides to support the hose.

4. The system of claim 3, wherein the one or more guides separate the first section from the second section.

5. The system of claim 1, further comprising:
   a plurality of sections of the hose, the plurality of sections including the first section, the second section, and the third section; and
   a plurality of connectors, the plurality of connectors including the first connector and the second connector;
   wherein a length of hose in use increases as a number of the plurality of sections in use increase.

6. A method of delivering materials, the method comprising:
   providing a hose having a first section and a second section, the first section and
   the second section connected by a first connector having a socket extending therefrom;
   connecting the socket to a first manifold;
   connecting a materials delivery system to the first manifold, the materials delivery system operated by a motor and a pump;
   pumping materials through the first manifold and into the first section, wherein the materials flow through the first manifold and the socket into the first section;
   applying pressure to the first connector such that the socket releases from the first manifold and fluidly connects the second section to the first section;
   pumping materials through the second section and into the first section;
   connecting a third section of hose to the second section via a second connector;
   connecting the second connector to a second manifold via a second socket;
   pumping materials through the second socket, into the second section, and then into the first section;
   applying pressure to the second connector such that the second socket releases from the second manifold and fluidly connects the third section to the second section; and
   pumping materials through the third section, the second section, and then to the first section;
   wherein friction from the second section does not impact the first section when the second section is not in use.

* * * * *